United States Patent [19]

Maxfield

[11] 3,907,162
[45] Sept. 23, 1975

[54] THERMOPLASTIC MATERIAL CONVEYANCE AND HANDLING PROCESS

[76] Inventor: Steven K. Maxfield, 3807 W. Lower Buckeye Rd., Phoenix, Ariz. 85007

[22] Filed: Feb. 21, 1973

[21] Appl. No.: 334,432

Related U.S. Application Data

[63] Continuation-in-part of Ser. No. 59,208, July 29, 1970, abandoned.

[52] U.S. Cl. ............... 222/1; 105/451; 126/343.5; 222/146 H; 222/178; 298/1 H
[51] Int. Cl.² ............................................ B67D 5/22
[58] Field of Search ...... 222/146 H, 146 HE, 146 R, 222/178, 1; 126/343.5; 105/451; 298/1 H; 73/233, 277, 431

[56] References Cited
UNITED STATES PATENTS

| | | | |
|---|---|---|---|
| 3,033,245 | 5/1962 | Schreter et al. | 222/146 H |
| 3,106,344 | 10/1963 | Baird | 222/146 H |
| 3,147,886 | 9/1964 | Sacco | 222/23 |
| 3,280,301 | 10/1966 | Anderson | 105/451 X |
| 3,283,575 | 11/1966 | Granberg | 73/233 |

Primary Examiner—Robert B. Reeves
Assistant Examiner—Thomas E. Kocovsky
Attorney, Agent, or Firm—Shanley, O'Neil and Baker

[57] ABSTRACT

Conveyance for thermoplastic material, e.g. roofing asphalt. The conveyance includes an insulated tank for the asphalt, heat-generating means, and a heat transfer system which maintains the asphalt in molten condition. The conveyance includes a pump for the asphalt, and by operation of selector valves the asphalt can be pumped either to a dispensing system which includes a meter, or to a recirculating system. The selector valves also can communicate the meter input side with drain conduits upon termination of dispensing. The asphalt drains through traps which prevent fume access to the meter and input piping. A valved conduit downstream of the meter drains the output side of the meter and contiguous piping. The meter is enclosed in a housing to which hot gases are ducted, supplying heat to the meter to prevent hardening of asphalt left in the meter. Or, the meter can be heated by hot fluids in the tank. Compensation for variations in asphalt density with temperature is effected by conversion of metered quantities delivered at the particular temperature to standard reference values.

22 Claims, 8 Drawing Figures

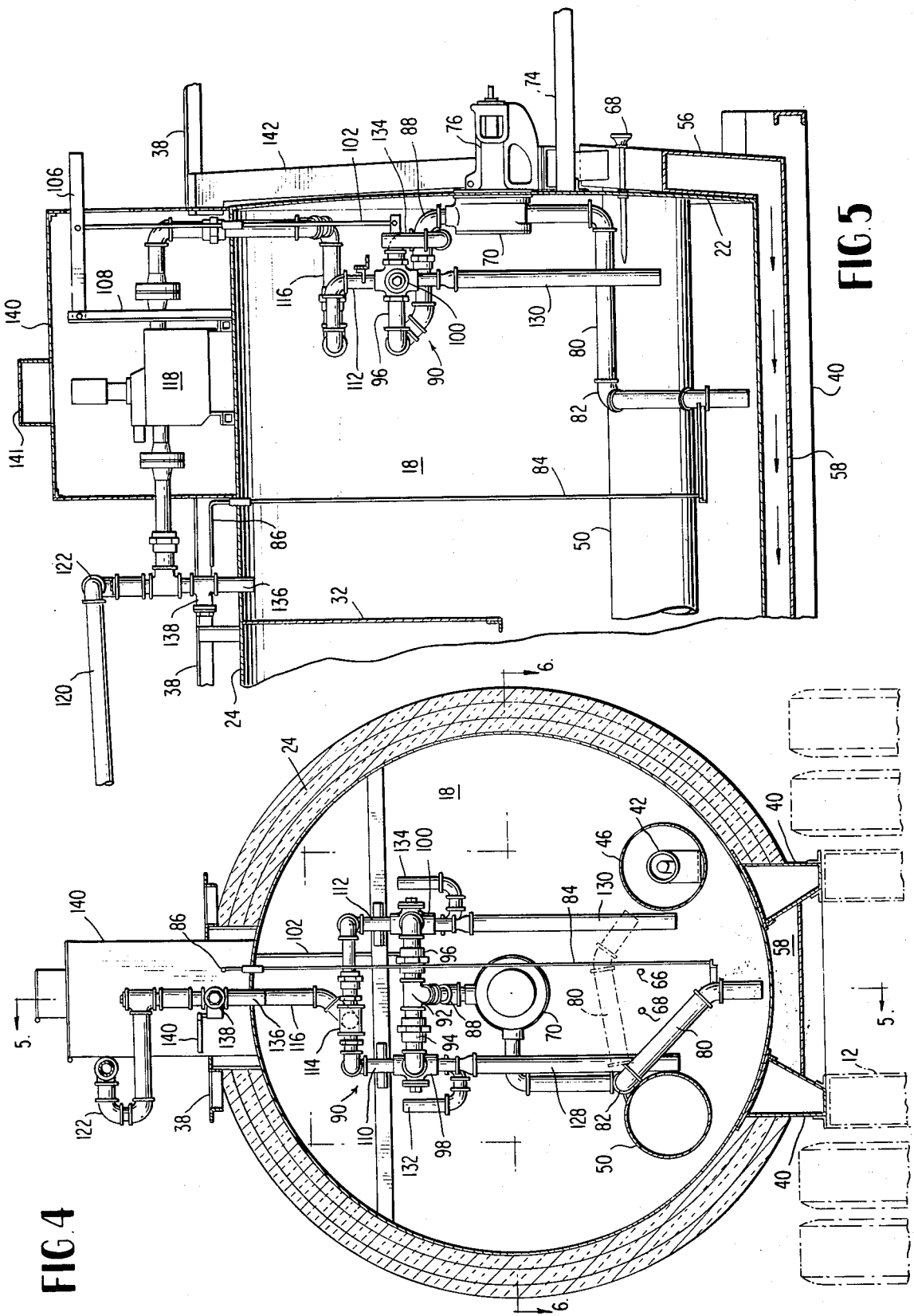

3,907,162

THERMOPLASTIC MATERIAL CONVEYANCE AND HANDLING PROCESS

CROSS-REFERENCE TO RELATED APPLICATION

This is a continuation-in-part of copending application Ser. No. 59,208, filed July 29, 1970 now abandoned.

BACKGROUND OF THE INVENTION

For decades, it has been the practice to produce roofing asphalt in refineries in a hot, molten state, to pour the molten asphalt into cartons or other containers, and to allow the asphalt to cool and harden. The containers are then shipped in commerce, eventually being purchased by roofing contractors who transport the containers of asphalt to the site of their roofing job. The contractors break the container from the hardened asphalt, and melt the asphalt in a heating unit (usually termed a "roofing kettle") for pumping or bucketing onto the roof for application there. Generally, the asphalt from the containers must be broken into smaller pieces for melting in the roofing kettles.

This system is disadvantageous in many respects. Firstly, it involves the costs of the containers, and the time, labor and apparatus required for packaging and cooling the asphalt. Secondly, it involves transport of a multiplicity of small container units, for which there are higher shipping and handling costs than for bulk material. Thirdly, the conventional system involves the time, labor and equipment necessary to break the containers from the hardened asphalt, to break the asphalt into smaller pieces, and to remelt the asphalt. The remelting is a messy operation in general, requiring continuous policing of broken containers and small pieces of asphalt from the melting area. Further, the roofing kettles tend to be unsafe to operate and to be around. Finally, there is believed to be a chemical breakdown which occurs upon remelting hardened asphalt, and which reduces the effectiveness of the asphalt as a sealing or bonding agent.

A main object of the invention is the elimination of the above drawbacks of the conventional asphalt handling system.

Other objects of the invention will appear from the following detailed description which, when considered in connection with the accompanying drawings, discloses two preferred embodiments of the invention for purposes of illustration only and not for definition of the scope of the invention.

BRIEF DESCRIPTION OF THE DRAWINGS

FIG. 4 is an enlarged, cross-sectional view on section line 4—4 of FIG. 1.

FIG. 5 is a view on cross-section line 5—5 of FIG. 4, with insulation and parts removed.

DETAILED DESCRIPTION OF THE PREFERRED EMBODIMENTS

Figure 1:
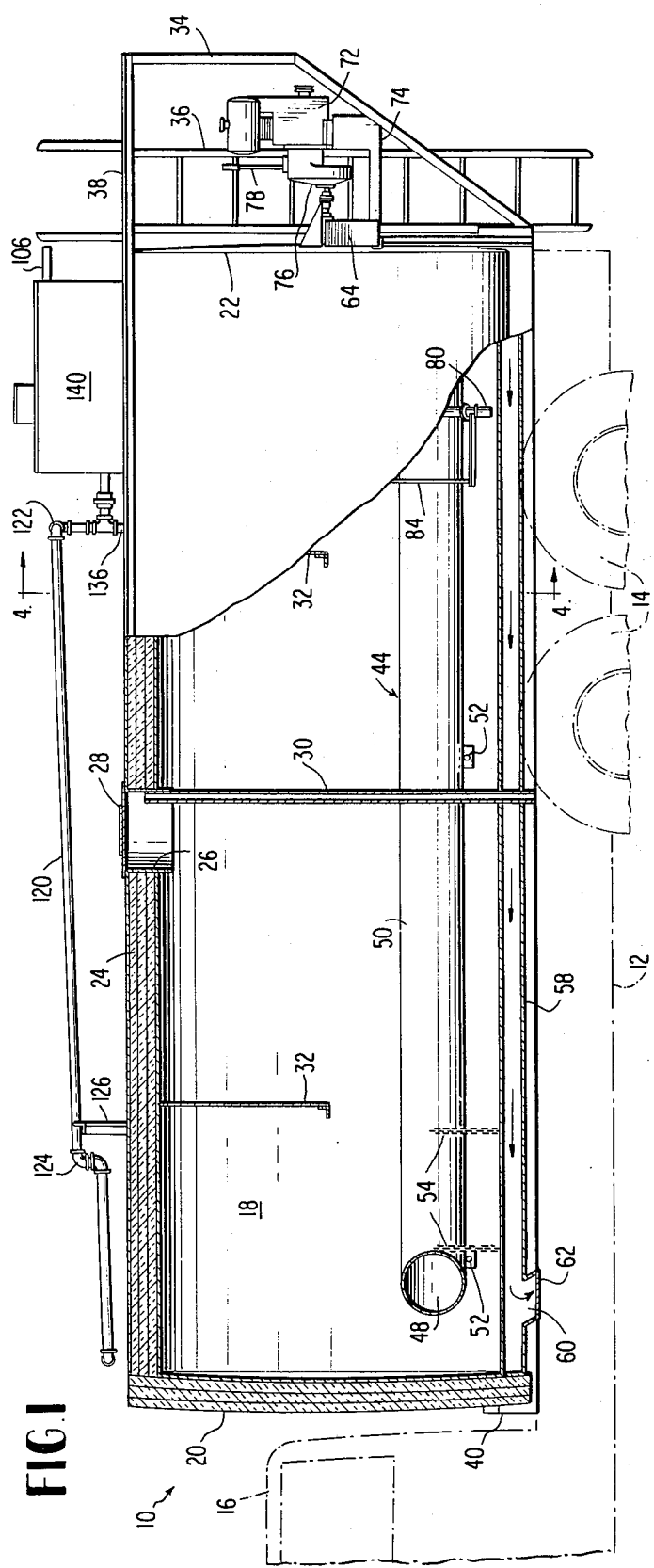
FIG. 1 is a side view, partly in cross-section, of an asphalt conveyance embodying principles of the invention.

FIG. 1 depicts an asphalt conveyance in the form of a highway tank truck 10. Truck 10 includes a base or chassis 12 which is mounted for ground-traversing movement by road wheels 14. Truck 10 has the usual operator's cab 16. A tank or reservoir 18 for receiving and holding molten asphalt for transport by truck 10 is mounted on chassis 12. Tank 18 has opposite endwalls 20, 22 and a continuous, cylindrical sidewall 24. Each wall has an inner and an outer sheet metal skin, with thermal insulation (e.g., mineral wool) sandwiched between the metal skins.

A manhole 26 provided with a removable cover 28 is formed in the top of tank wall 24. Manhole 26 provides access to tank 18 for maintenance purposes, and also provides an opening through which tank 18 can be filled with molten asphalt. An upright pipe 30, which is open at both ends, has its upper end within manhole 26 and its lower end positioned to discharge through the bottom of tank wall 24. Pipe 30 vents tank 18, and provides for overflow of excess asphalt should too much asphalt be pumped into tank 18. Surge-retarding baffles 32 extend across the upper portion of tank 18.

A skeleton framework 34 protrudes from the right end of tank 18 as viewed in FIG. 1, and carries a ladder 36. Ladder 36 provides access to a catwalk 38 on top of tank wall 24. A pair of skids 40 (FIGS. 1, 4) at the bottom of tank wall 24 supports the tank on truck chassis 12.

Figure 2:
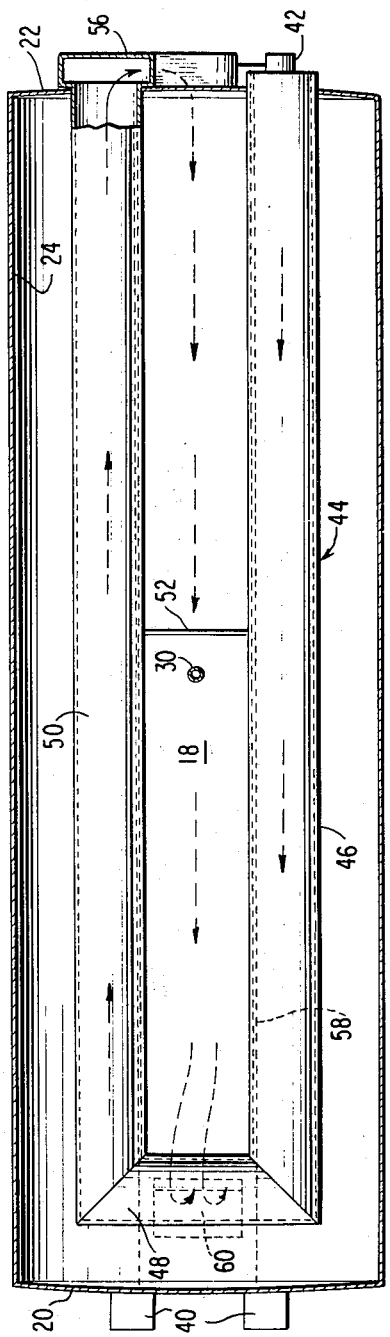
FIG. 2 is a top cross-sectional view, with insulation and parts removed, showing heat transfer details of the structure of FIG. 1.
Figure 3:
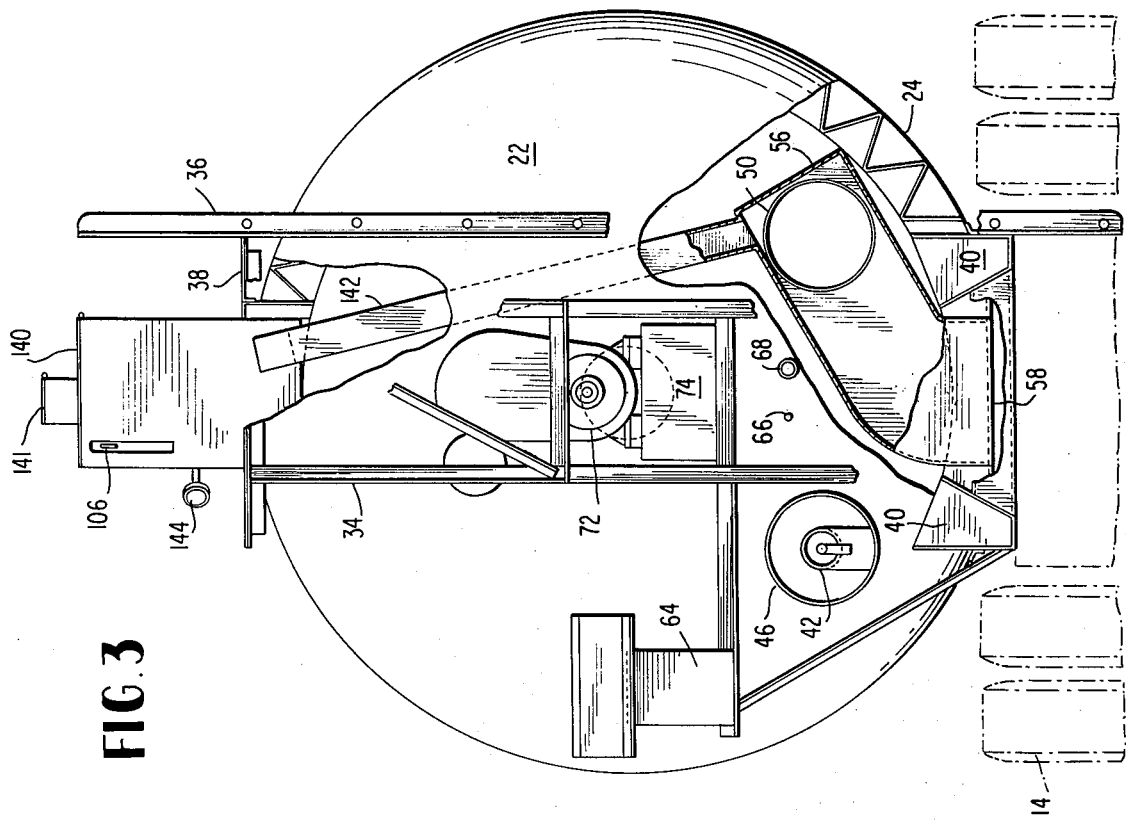
FIG. 3 is an enlarged, right end elevational view, with parts broken away, of the structure of FIG. 1.

Heat-generating means in the form of a propane burner 42 (FIGS. 2, 3, 4) are mounted on tank endwall 22. The burner generates heat by combustion of bottled propane from a conventional source (not shown), and discharges the hot, gaseous products of combustion into a fire tube 44 which is in heat exchange relationship with asphalt in tank 18 to transfer heat energy from the hot gases to the asphalt in the tank. Fire tube 44 extends along the bottom of tank 18 for nearly the entire length of the tank. The fire tube is U-shaped, having a first or burner side 46 which extends from burner 42 to a transverse portion 48 which communicates the burner side of the tube with a second or exhaust side 50. Fire tube 44 is mounted on support bars 52, which extend transversely of the tank at spaced locations along the fire tube. Hold-down chains 54 prevent the fire tube from being buoyed upwardly in the tank by molten asphalt.

Exhaust side 50 of fire tube 44 communicates with entry portion 56 of an exhaust duct having an elongated portion 58 (see FIG. 1) which extends along the bottom of tank 18 in heat exchange relationship with asphalt in the tank and which further serves to transfer heat to the asphalt. The exhaust duct has an outlet 60 for venting the exhaust gases to atmosphere. Outlet 60 has a sliding-door cover 62. As shown by the directional arrows in FIGS. 1 and 2, the hot gases flow from burner 42 along burner side 46 of fire tube 44, through transverse portion 48, along exhaust side 50, then into exhaust duct portions 56 and 58 sequentially and along duct portion 58 to exhaust outlet 60. The hot gases maintain asphalt in the tank in molten condition and at the proper pumping temperature (about 380°–450°F). Burner controls housed in a box 64 (FIGS. 1, 3) respond to a thermostat (not shown) which receives signals from thermocouple in a pipe 66 (FIG. 3) to automatically maintain the asphalt at the desired temperature. An asphalt temperature gauge 68 (FIGS. 3, 5) is provided for indicating asphalt temperature.

Figure 6:
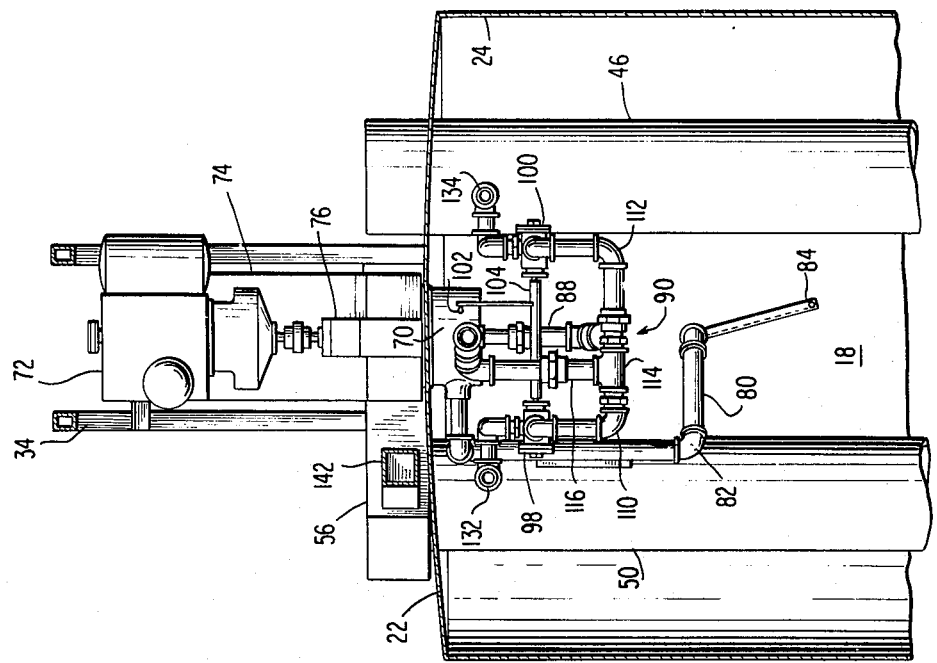
FIG. 6 is a cross-sectional view on section line 6—6 of FIG. 4, with insulation and parts removed.

A pump 70 (FIGS. 4, 5, 6) for the molten asphalt is mounted inside tank 18 on tank endwall 22. Pump 70 is driven by an engine 72 (FIGS. 1, 6) which is mounted on a base 74 carried by skeleton framework 34. Engine 72 drives the pump through a power transmission unit 76 which includes a clutch which can be engaged and disengaged by manual operation of a lever 78.

A single intake conduit 80 (FIGS. 4, 5) communicates with pump 70. Intake conduit 80 includes a movable joint 82. The intake end portion of intake conduit 80 can be raised and lowered by raising and lowering a control rod 84 which is attached to intake conduit 80 and extends upwardly through the top of tank wall 24 to an operating handle 86. Operation of control rod 84 swings the intake portion of intake conduit 80 about a horizontal axis at movable joint 82, between the solid and dotted line positions indicated in FIG. 4. The upper or dotted-line position is the normal operating position, whereby asphalt in tank 18 never drops to a level below the top of the fire tube. By assuring that the fire tube is always immersed in asphalt, overheating of the fire tube and a resultant fire hazard is avoided. When it is desired to pump the tank as dry as possible, for access to the tank for maintenance or for other purposes, the intake portion of intake conduit 80 is lowered to the solid line position in which the conduit inlet is contiguous to the tank bottom.

A single output conduit 88 communicates with pump 70. Molten asphalt flowing in pump output conduit 88 passes from the pump to a piping complex 90 (FIG. 4–6) in which the asphalt can be selectively directed into different paths. In complex 90, the asphalt first encounters a tee 92 (FIG. 4) where the flow divides into two portions. The two portions respectively flow through short, L-shaped conduits 94, 96 to selector valves 98, 100. Valves 98, 100 are conventional two-position, four-port, four-way valves, and the path of asphalt from the valves depends upon the valve position. Valves 98, 100 are positioned simultaneously by operation of a valve control rod 102 which is connected through valve positioner bar 104 (FIG. 6) to both selector valves. Valve control rod 102 extends upwardly through tank wall 24 to a valve operating lever 106 which is pivoted at one end to a standard 108 on tank wall 24. The top end of rod 102 is pivoted to lever 106, and manual raising and lowering of the operating lever moves rod 102 upwardly and downwardly to change valves 98, 100 between first and second positions to be described in detail.

When the valves are in the first position, the asphalt streams are directed respectively from short conduits 94, 96 (FIGS. 4, 5) upwardly into conduits 110, 112. The asphalt streams pass along these conduits to another tee 114 (FIGS. 4, 6) where the streams merge and flow into a single input conduit 116 of a system for dispensing asphalt from tank 18.

The dispensing system includes a meter 118 and a dispensing conduit 120. Input conduit 116 feeds the input side of meter 118, and dispensing conduit 120 conducts asphalt away from the meter output side. Meter 118 measures the amount of asphalt dispensed from tank 18, and can be of any suitable, conventional type. A Rockwell-Brodie model B-53 H meter, manufactured by the Rockwell Mfg. Co., Statesboro, Ga., is suitable.

Dispensing conduit 120 has movable joints at 122 and 124. The movable joints allow dispensing conduit 120 to articulate and swing to a wide range of positions on either side of the tank truck to dispense asphalt into a holding tank at a job site. A pipe rest 126 (FIG. 1) is provided on the top of tank wall 24, to support dispensing conduit 120 when the truck is in transit.

A recirculating conduit 128 (FIGS. 4, 5) communicates with selector valve 98 and with tank 18, and another recirculating conduit 130 communicates with selector valve 100 and with tank 18. Piping complex 90, with its selector valves, thus can selectively communicate the twin recirculating conduits or the dispensing system with pump discharge conduit 88. When the two-position selector valves are in the first position, as described above, the asphalt flows from the pump discharge upwardly to dispensing system intake conduit 116. When the valves are in the second position, the asphalt streams flowing in conduits 94, 96 are respectively directed by valves 98, 100 downwardly into recirculating conduits 128, 130 instead of upwardly through conduits 110, 112. Thus, by operation of the selector valves, asphalt can be dispensed from the tank truck, or recirculated inside the tank. Recirculation of asphalt in tank 18 promotes maintenance of the asphalt at a uniform temperature.

Piping complex 90 also includes flow passages for draining asphalt from the meter input side and contiguous piping upon termination of the dispensing operation. The drain piping includes turn trap conduits 132, 134 (FIGS. 4, 5, 6) each of which includes a U-shaped portion with the bight or bend of the "U" below the inlet and outlet ends of the trap conduit. Trap conduit 132 communicates selector valve 98 with tank 18, and trap conduit 134 communicates selector valve 100 with tank 18. When selector valves 98, 100 are in the second position (i.e., positioned to direct the pump discharge to recirculating conduits 128, 130), the selector valves also communicate dispensing system input conduit 116 with trap conduits 132, 134. Thus, trap 132 is communicated with conduit 110 by selector valve 98, and through conduit 110 the trap conduit is communicated with dispensing system input conduit 116. Similarly, trap conduit 134 is communicated with conduit 112 by selector valve 100, and through conduit 112, with input conduit 116.

With the trap conduits communicating with dispensing system input conduit 116, molten asphalt in the meter input side and contiguous piping drains down through conduit 116 by gravity and divides at tee 114 into two streams. The two streams respectively flow through conduits 110, 112, selector valves 98, 100, and trap conduits 132, 134 out into tank 18. However, each trap retains a mass of molten asphalt in the bend, and this mass of asphalt prevents access of asphalt fumes from tank 18 to meter 118 and meter input piping when the level of asphalt in tank 18 drops lower than the outlet of trap conduits 132, 134. The fumes would cause a carbonaceous deposit to form on the inside walls of the flow passages of the meter and input piping, and the deposit would interfere with effective operation of the dispensing system if allowed to form and accumulate.

In piping complex 90, twins of the selector valves, recirculating conduits, traps, and associated piping, are provided to provide two flow paths. One of the flow paths will act as a back-up, should the other become clogged by asphalt.

For draining the meter output side and contiguous piping, a drain conduit 136 (FIG. 4, 5) communicates with dispensing conduit 120 at a location contiguous to meter 118, and with tank 18. A quick-acting gate valve 138 is provided to open and close drain conduit 136 to flow of molten asphalt. Valve 138 is operated by a handle 140, and when valve 138 is open, asphalt in the meter output side and contiguous piping drains by gravity into tank 18. After draining, valve 138 is closed, to prevent fumes from passing to the meter output side and dispensing piping.

While most of the molten asphalt can be drained from the meter and contiguous piping by drain conduits 132, 134, 136, some asphalt will unavoidably remain there because of the highly adherent properties of the asphalt. To prevent hardening of this remaining asphalt in the meter and connections, heat is supplied to the meter and contiguous piping. This is done by conducting burner exhaust gases to a housing 140 which completely encloses meter 118. The hot gases are conducted to housing 140 by a duct 142 which communicates with exhaust duct entry portion 56 and with housing 140. Hot gases from the fire tube pass into the exhaust duct entry portion, and flow up through duct 142 to envelop the meter, heating the meter to maintain retained asphalt in molten condition. A meter temperature gauge 144 (FIG. 3) protrudes through a side wall of housing 140, to indicate meter temperature. Housing 140 includes a small, hinged lid 141 which swings aside for access to meter 118.

It should be observed that, even when the burner is not firing, the hot asphalt in tank 18 heats the gases in fire tube 44, and these gases circulate up through duct 142 to housing 140. The molten asphalt in the tank also keeps recirculating conduits 128, 130, selector valves 98, 100, trap conduits 132, 134, and pump 70 in a warm state, since these elements are located within tank 18.

In operation, tank 18 is filled with molten asphalt through manhole 26 at a refinery or other central supply facility. Burner 42 is fired automatically as necessary to maintain the asphalt in tank 18 in molten condition and at a proper pumping temperature. Motor 72 is advantageously operated to drive pump 70, with selector valves 98, 100 positioned to direct the pump discharge into recirculating conduits 128, 130 to recirculate the asphalt in tank 18 to maintain a uniform asphalt temperature throughout the tank.

When tank 18 has been filled, cover 28 is placed over manhole 26 and the truck is driven to a roofing job site at which is located a small holding tank having a heating system for maintaining asphalt in a molten state. This heating system can be like that described above on mobile unit 10. At the job site, dispensing conduit 120 is lifted from pipe rest 126 and swung to register with a filler opening in the small tank. A pre-delivery reading is taken from meter 118. If the meter has printing features, this can involve stamping the meter reading on a delivery ticket.

Selector valves 98, 100 are then operated to direct asphalt flowing from pump 70 to the dispensing system instead of to the recirculating system. Asphalt flows from the pump through meter 118 and dispensing conduit 120 (valve 138 being closed) into the small onsite tank, the meter constantly monitoring the quantity of asphalt being supplied to the small tank. When the small tank is filled, or when as much asphalt has been delivered as is needed at the job site as determined by observation of the meter, selector valves 98, 100 are again operated to direct the asphalt flow back to the recirculating tubes for recirculation inside tank 18. This action also communicates meter input conduit 116 with traps 132, 134, and molten asphalt drains from the meter input side and contiguous piping back out into tank 18 through the traps.

Drain valve 138 is opened to drain asphalt from the meter output and contiguous piping back into tank 18. Dispensing conduit 120 is removed from registry with the filler opening of the small tank, and placed on pipe rest 126. A post-delivery reading is taken from meter 118. The truck is then driven to another roofing job site, which can be miles away, where the foregoing steps are repeated and another small tank at that job site is supplied with asphalt. The process is carried out repeatedly as the tank truck is driven from job to job, until the supply of asphalt in tank 18 is finally depleted. At this time, truck 10 is returned to the refinery or other central supply facility for refilling with molten asphalt.

Figure 7:
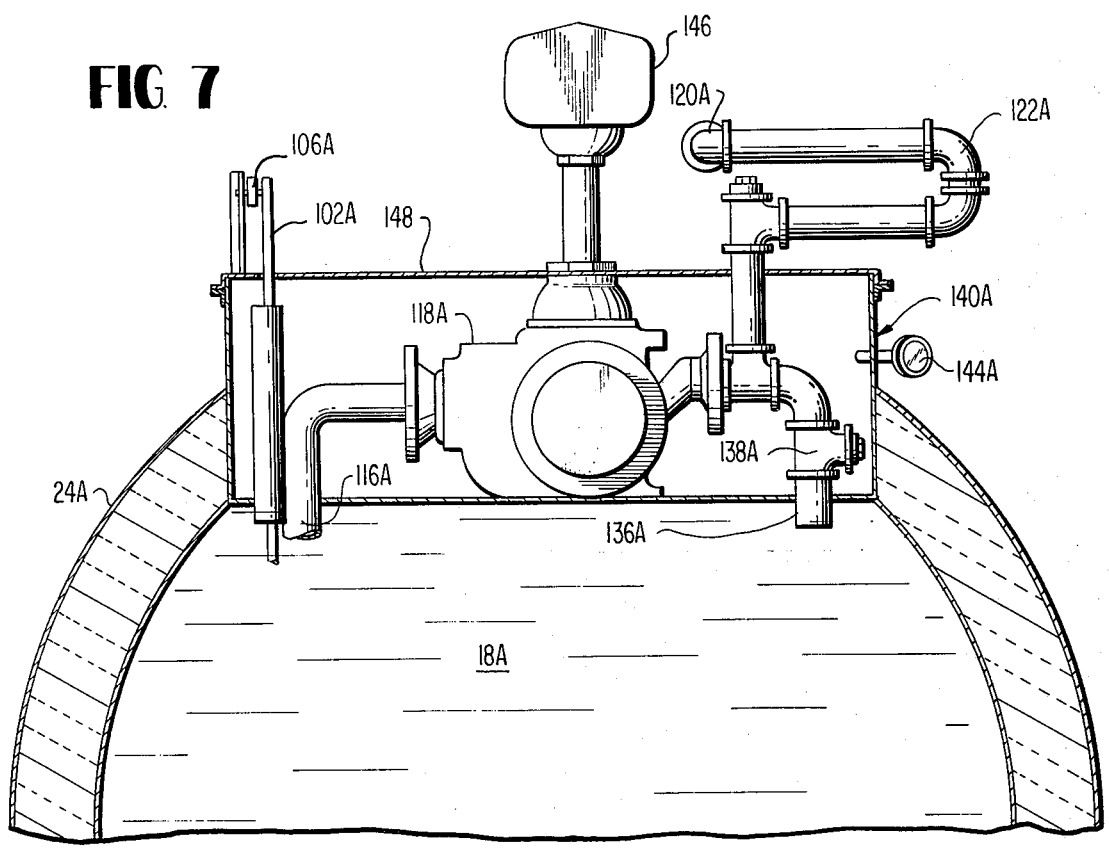
FIG. 7 is a partial, transverse cross-sectional view showing details of another asphalt conveyance embodying principles of the invention.
Figure 8:
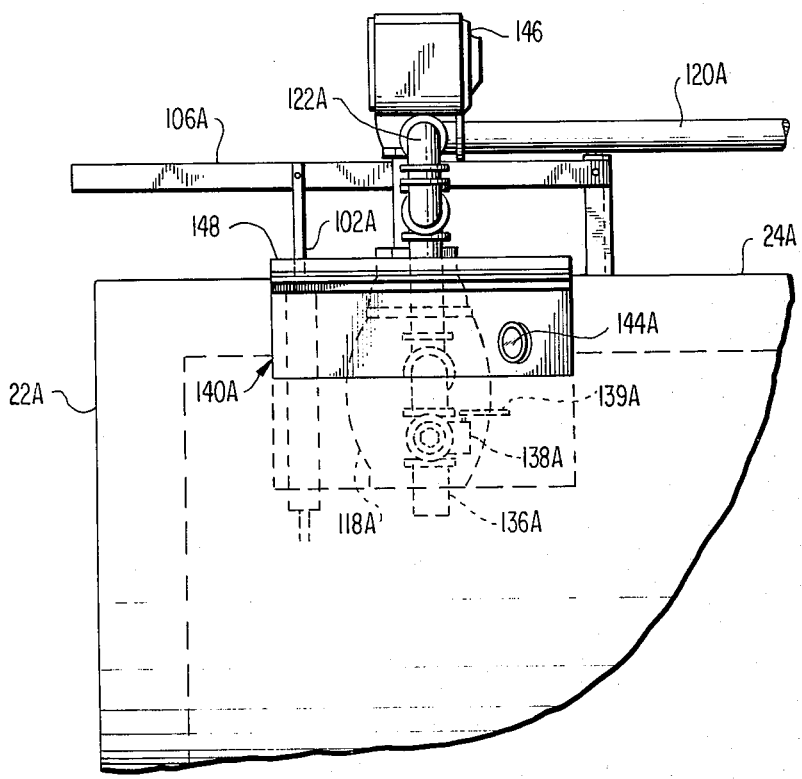
FIG. 8 is a right-side view of details illustrated in FIG. 7.

FIGS. 7-8 illustrate another embodiment of the invention, and in these Figures reference characters with the suffix "A" denote elements similar to the elements designated by the corresponding reference characters without the suffix.

In the embodiment of FIG. 7-8, the molten asphalt in tank 18A is heated by heat transfer means in the form of a fire tube (not shown) like that employed in the embodiment of FIGS. 1-6. However, meter 118A is heated by heat exchange with hot fluids in tank 18A rather than directly by hot gases ducted from the burner. This is effected through heat transfer means in the form of a meter housing 140A which is in heat exchange relationship with the tank by virtue of being partially recessed therein. With this arrangement, the hot asphalt liquid and/or fumes (depending upon the level of asphalt in the tank) which are inside tank 18A supply heat to the meter and thereby prevent hardening of asphalt in the meter. The heat exchanging of hot fluids in the reservoir with the meter in this way makes it possible to eliminate separate ductwork such as used in the embodiment of FIGS. 1-6 for conducting hot products of combustion to the meter housing, thus simplifying construction while still making it possible to employ a single heat source for heating both the tank and the meter which is done in FIGS. 1-6. However, it will be appreciated that a similar embodiment could be constructed using one heat generator to heat the tank and another to heat the meter.

In FIGS. 7-8, meter 118A includes an indicator portion 146 which projects through meter housing cover 148, so there is no need to remove the housing cover in order to read the meter. The portion of housing 140A (including cover 148) which is located externally of tank wall 24A is preferably lined with insulation (not shown) for maximum retention of warmth supplied to the interior of the housing by the hot fluids in the tank.

With the exception of the above-described differences, the embodiment of FIGS. 7–8 is similar to that of FIGS. 1–6.

The density of asphalt varies with temperature. The hotter the asphalt, the less it weighs per gallon. For example, asphalt at 60°F weighs 8.33 pounds per gallon but at 450°F weighs 7.25 pounds per gallon. To overcome this problem and provide accurate, fair measurement of asphalt delivered, applicant senses the temperature of the metered quantity of molten asphalt delivered at each job site and converts the metered quantity to a quantity at a standard reference temperature (e.g. 60°F). This can be done manually by observing meter temperature gauge 144 or 144A and calculating from the meter temperature, from the gallons delivered at that temperature, and from standard asphalt density tables, the gallonage equivalent at a standard reference temperature. Or, the sensing and conversion can be affected automatically by a conventional temperature compensator with which the meter of either the embodiment of FIGS. 1–6 or the embodiment of FIGS. 7–8 can be equipped, and which converts the gallons actually delivered at any particular delivery temperature to gallons at a standard reference temperature. Irrespective of which technique is employed to obtain the gallonage at standard reference temperature, this value is converted to weight for billing purposes, since asphalt is marketed by weight, and the weight is a true value for fairness to the customer and the asphalt vendor, and for compliance with weights-and-measures regulations.

Asphalt conveyances and handling processes according to the invention are highly advantageous. Cost of the asphalt to the roofing contractors is lowered because the costs of labor, equipment, and supplies necessary for packaging and cooling the asphalt are eliminated. Shipping and handling costs are reduced because the material is handled in bulk form rather than is small units. The exact amount of asphalt necessary for a given job can be supplied as needed. Costs are further lowered as a result of elimination of the labor and equipment necessary to break containers from the asphalt, break the asphalt into small pieces, and remelt the asphalt. Also saved is the time and labor necessary to police the broken containers, small asphalt pieces, and like debris which tended to accumulate at the site of roofing kettles. And safety at the job site is enhanced by elimination of the kettles. Finally, where asphalt can be delivered directly from a refinery, no chemical breakdown from solidification and remelting can occur because the asphalt is neither solidified nor remelted before application to a roof.

It will be appreciated that thermoplastic materials other than asphalt can be handled with conveyances in accordance with the invention. It will further be appreciated that in the embodiment of FIGS. 1–6 the indicator and/or printing components of the meter can be located outside meter housing 140 so that it is not necessary to open the housing to take a meter reading.

The above detailed description has been with reference to two preferred embodiments of the invention. Many other embodiments are contemplated. The principles of the invention are set forth in the appended claims, and reference will be made to the claims for definition of the scope of the invention.

I claim:

1. Thermoplastic material conveyance structure, comprising
   a base,
   means mounting the base for ground-traversing movement,
   means including insulated walls defining a reservoir carried by the base for holding thermoplastic material,
   heat-generating means carried by the base,
   first heat transfer means for transferring heat from the heat-generating means to thermoplastic material in the reservoir,
   dispensing means for dispensing molten thermoplastic material from the reservoir,
   the dispensing means including meter means for measuring the amount of molten thermoplastic material dispensed from the reservoir, and
   second heat transfer means for transferring heat from the heat-generating means to the meter means to prevent hardening of thermoplastic material in the meter means.

2. The structure of claim 1, including
   drain means for draining molten thermoplastic material from the meter means upon termination of dispensing.

3. The structure of claim 1, including
   recirculating means for recirculating molten theremoplastic material in the reservoir,
   pumping means for molten thermoplastic material in the reservoir, and
   means including valve means for selectively communicating the meter means and the recirculating means with the pumping means.

4. The structure of claim 1,
   the first heat transfer means including a hot fluid tube in heat exchange relationship with the reservoir,
   the second heat transfer means including a housing enclosing the meter means, and
   duct means communicating the hot fluid tube with the housing.

5. The structure of claim 4,
   the heat-generating means including a burner,
   the burner discharging hot, gaseous products of combustion into the hot fluid tube.

6. The structure of claim 1,
   the first heat transfer means including a hot fluid tube in heat exchange relationship with the reservoir,
   the second heat transfer means including a housing enclosing the meter means,
   the housing being in heat exchange relationship with the reservoir.

7. The structure of claim 1,
   the meter means having input and output sides, and including
   first drain means for draining molten thermoplastic material from the meter means input side upon termination of dispensing, and
   second drain means for draining molten thermoplastic material from the meter means output side upon termination of dispensing.

8. Thermoplastic material conveyance structure, comprising
   a base,
   means mounting the base for ground-traversing movement, means including insulated walls defining a reservoir carried by the base for holding thermoplastic material, heat-generating means carried by the base, heat transfer means for transferring heat from the heat-generating means to thermoplastic material in the reservoir, dispensing means for dispensing molten thermoplastic material from the reservoir, the dispensing means including meter means for measuring the amount of molten thermoplastic material dispensed from the reservoir, and drain means for draining molten thermoplastic material from the meter means upon termination of dispensing, the drain means including trap means for trapping molten thermoplastic material to prevent fume access to the meter means.

9. Thermoplastic material conveyance structure, comprising a base, means mounting the base for ground-traversing movement, means including insulated walls defining a reservoir carried by the base for holding thermoplastic material, heat-generating means carried by the base, heat transfer means for transferring heat from the heat-generating means to thermoplastic material in the reservoir, dispensing means for dispensing molten thermoplastic material from the reservoir, the dispensing means including meter means for measuring the amount of molten thermoplastic material dispensed from the reservoir, the meter means having input and output sides, recirculating means for recirculating molten thermoplastic material in the reservoir, pumping means for molten thermoplastic material in the reservoir, means including valve means for selectively communicating the meter means and the recirculating means with the pumping means, and drain means for draining molten thermoplastic material from the meter means input side upon termination of dispensing, the drain means including trap means for trapping molten thermoplastic material to prevent fume access to the meter means, the valve means communicating the meter means with the trap means when communicating the pumping means with the recirculating means.

10. The structure of claim 9, the recirculating means, the valve means, and the trap means being located within the reservoir.

11. The structure of claim 9, including second drain means for draining molten thermoplastic material from the meter means output side upon termination of dispensing.

12. The structure of claim 11, the dispensing means including dispensing conduit means communicating with the meter means output side, the second drain means including drain conduit means communicating with the dispensing conduit means and with the reservoir, and second valve means for opening and closing the drain conduit means to flow to molten thermoplastic material.

13. The structure of claim 9, including a single output conduit for the pumping means, and a single input conduit for the meter means, the valve means including twin valves, each valve communicating with the pumping means output conduit and with the meter means input conduit, the recirculating means including twin recirculating conduits, each recirculating conduit communicating with one of the valves and with the reservoir, the trap means including twin trap conduits, each trap conduit communicating with one of the valves and with the reservoir.

14. The structure of claim 13, including means for simultaneously operating the twin valves to selectively communicate the meter means and the reciculating means with the pumping means.

15. Asphalt handling process, comprising providing a conveyance having an insulated reservoir for holding molten asphalt, supplying molten asphalt to the reservoir, heating molten asphalt in the reservoir to maintain the asphalt in molten condition, transporting the molten asphalt sequentially to a plurality of job sites, pumping a quantity of molten asphalt from the reservoir into a container at each job site, metering the quantity of molten asphalt pumped from the reservoir at each job site, the step of metering the molten asphalt being performed with aid of meter means, and heating the meter means to prevent hardening of molten asphalt in the meter means.

16. The process of claim 15, including the step of draining molten asphalt from the meter means upon completion of the step of pumping a quantity of molten asphalt into the container at each job site.

17. The process of claim 15, the step of heating the molten asphalt in the reservoir including passing hot, gaseous products of combustion in heat exchange relationship with molten asphalt in the reservoir, the step of heating the meter means including passing hot, gaseous products of combustion in heat exchange relationship with the meter means.

18. The process of claim 15, the step of heating the meter means including heat exchanging hot fluids in the reservoir with the meter means.

19. Thermoplastic material handling process, comprising providing a conveyance having an insulated reservoir for holding molten thermoplastic material, supplying molten thermoplastic material to the reservoir, heating molten thermoplastic material in the reservoir to maintain the thermoplastic material in molten condition, transporting the molten thermoplastic material sequentially to a plurality of job sites, pumping a quantity of molten thermoplastic material from the reservoir into a container at each job site, metering the quantity of molten thermoplastic material pumped from the reservoir at each job site, the step of metering the molten thermoplastic material being performed with aid of meter means, and heating the meter means to prevent hardening of molten thermoplastic material in the meter means.

20. Thermoplastic material conveyance structure, comprising a base, means mounting the base for ground-traversing movement, means including insulated walls defining a reservoir carried by the base for holding thermoplastic material, heat-generating means carried by the base, dispensing means for dispensing molten thermoplastic material from the reservoir, the dispensing means including meter means for measuring the amount of molten thermoplastic material dispensed from the reservoir, and heat exchange means for transferring heat from the heat-generating means to thermoplastic material in the reservoir and to the meter means to prevent hardening of thermoplastic material in the reservoir and in the meter means.

21. The structure of claim 20, the heat exchange means including first and second heat transfer means, the first heat transfer means including a hot fluid tube in heat exchange relationship with the reservoir, the second heat transfer means including a housing enclosing the meter means, and duct means communicating the hot fluid tube with the housing.

22. The structure of claim 20, the heat exchange means including first and second heat transfer means, the first heat transfer means including a hot fluid tube in heat exchange relationship with the reservoir, the second heat transfer means including a housing enclosing the meter means, the housing being in heat exchange relationship with the reservoir.

* * * * *